United States Patent
Brandin

(10) Patent No.: US 6,792,428 B2
(45) Date of Patent: Sep. 14, 2004

(54) METHOD OF STORING AND FLATTENING A STRUCTURED DATA DOCUMENT

(75) Inventor: Christopher Lockton Brandin, Colorado Springs, CO (US)

(73) Assignee: Xpriori, LLC, Colorado Springs, CO (US)

(*) Notice: Subject to any disclaimer, the term of this patent is extended or adjusted under 35 U.S.C. 154(b) by 35 days.

(21) Appl. No.: 09/977,267

(22) Filed: Oct. 12, 2001

(65) Prior Publication Data

US 2002/0052878 A1 May 2, 2002

Related U.S. Application Data

(60) Provisional application No. 60/240,428, filed on Oct. 13, 2000, and provisional application No. 60/243,255, filed on Oct. 25, 2000.

(51) Int. Cl.$^7$ .............................................. G06F 17/06
(52) U.S. Cl. .................... 707/101; 715/513; 707/102
(58) Field of Search .................. 707/1–10, 200–206, 707/100–104.1; 715/513–525

(56) References Cited

U.S. PATENT DOCUMENTS

6,735,592 B1 * 5/2004 Neumann et al. ........... 707/101
6,735,594 B1 * 5/2004 Zimowski et al. .......... 707/102
6,735,602 B2 * 5/2004 Childress et al. ........... 707/200

OTHER PUBLICATIONS msdn.microsoft.com/msdnnews/2001/may/excel/Excel.asp.*
www.geocities.com/schulerrw/12box/12box.html.*
www.turnkey.com.au/Site/malt/main4.htm.*
Pietriga et al., VXT: Visual XML Transformer, Human–Centric Computing Languages and Environments, 2001, Proceedings IEEE Symposia on, Sep. 5–7, 2001, pp. 405–405.*
Kinno et al., Environmentally–adaptive XML transformation and its application to content delievery, Communications, 2003, ICC '03, IEEE International Conference on, vol. 2, May 11–15, 2003, pp. 844–848, vol. 2.*
Ishitani, Document transformation system from papers to XML data based on pivot XML document method, Document Analysis and Recognition, 2003, Proceedings, Seventh International Conference on, Aug. 3–6, 2003, pp. 250–255, vol. 1.*

* cited by examiner

Primary Examiner—David Jung
(74) Attorney, Agent, or Firm—Law Office of Dale B. Halling, LLC

(57) ABSTRACT

A method of flattening a structured data document includes the steps of receiving a structured data document. Next, a first data entry is searched for by the system. When the first data entry is found, it is determining if an attribute is defined before the first data entry. When the attribute is defined before the first data entry, a first line containing all open tags before the attribute and the attribute is created. A record indicator is stored on the first line.

19 Claims, 22 Drawing Sheets

```
                          12        22  16  24
18 — <CATALOG>
20 —     <CD>
26 —         <TITLE>Empire Burlesque</TITLE>
             <ARTIST>Bob Dylan</ARTIST>
         <COUNTRY>USA</COUNTRY>
           <COMPANY>Columbia</COMPANY>
           <PRICE>10.90</PRICE>
           <YEAR>1985</YEAR>
         </CD>
         <CD>
             <TITLE>Hide your heart</TITLE>
             <ARTIST>BonnieTylor</ARTIST>
         <COUNTRY>UK</COUNTRY>
         <COMPANY>CBS Records</COMPANY>
            <PRICE>9.90</PRICE>
            <YEAR>1988</YEAR>
         </CD>
         <CD>
             <TITLE>Greatest Hits</TITLE>
             <ARTIST>Dolly Parton</ARTIST>
         <COUNTRY>USA</COUNTRY>
         <COMPANY>RCA</COMPANY>
            <PRICE>9.90</PRICE>
            <YEAR>1982</YEAR>
         </CD>
         <CD>
             <TITLE>Still got the blues</TITLE>
             <ARTIST>Gary More</ARTIST>
          <COUNTRY>UK</COUNTRY>
           <COMPANY>Virgin records</COMPANY>
             <PRICE>10.20</PRICE>
             <YEAR>1990</YEAR>
         </CD>
     </CATALOG>
                  14
```

FIG. 1

```
                    52
              56  62  68    46
            54 \ 58\  \64\ /
              ‾‾‾‾‾‾‾‾‾‾‾‾‾
              (1,B,S,[ ],0,1,ND>MetaData>http://neocore.com/docMetaData:MetaData>http://neocore.com/docMetaData:TimeStamp>,
               1,N,I,[ ],0,4,ND>MetaData>http://neocore.com/docMetaData:MetaData>http://neocore.com/docMetaData:DocID>,c:\testxml\testdoe.xml
        42 ─── 1,N,E,[ ],0,4,ND>MetaData>http://neocore.com/docMetaData:MetaData>http://neocore.com/docMetaData:SchemaName>,schema
               3,N,E,[ ],0,4,ND>MetaData>http://neocore.com/docMetaData:MetaData>http://neocore.com/docMetaData:InstructFileName>,ifile
               1,N,E,[ ],0,2,ND>MyHeader>,Header  47        50
        44 ─── 1,N,E,[ ],0,2,ND>CATALOG>CD>TITLE>,Empire Burlesque ─16
        66 ─── 1,N,E,[ ],5,4,ND>CATALOG>CD>ARTIST>Bob Dylan  48
               1,N,E,[ ],5,4,ND>CATALOG>CD>COUNTRY>,USA
               1,N,E,[ ],5,4,ND>CATALOG>CD>COMPANY>,Columbia
               1,N,E,[ ],5,4,ND>CATALOG>CD>PRICE>,10.90
               1,N,E,[ ],5,4,ND>CATALOG>CD>YEAR>,1985
        60 ─── 2,N,E,[ ],5,4,ND>CATALOG>CD>TITLE>,Hide your heart
               1,N,E,[ ],5,3,ND>CATALOG>CD>ARTIST>,Bonnie Tylor
               1,N,E,[ ],11,4,ND>CATALOG>CD>COUNTRY>,UK
               1,N,E,[ ],11,4,ND>CATALOG>CD>COMPANY>,CBS Records
               1,N,E,[ ],11,4,ND>CATALOG>CD>PRICE>,9.90
               1,N,E,[ ],11,4,ND>CATALOG>CD>YEAR>,1988
               2,N,E,[ ],11,4,ND>CATALOG>CD>TITLE>,Greatest Hits
               1,N,E,[ ],5,3,ND>CATALOG>CD>ARTIST>Dolly Parton
               1,N,E,[ ],17,4,ND>CATALOG>CD>COUNTRY>,USA
               1,N,E,[ ],17,4,ND>CATALOG>CD>COMPANY>,RCA
               1,N,E,[ ],17,4,ND>CATALOG>CD>PRICE>,9.90
               1,N,E,[ ],17,4,ND>CATALOG>CD>YEAR>,1982
               2,N,E,[ ],17,4,ND>CATALOG>CD>TITLE>,Still got the blues
               1,N,E,[ ],5,3,ND>CATALOG>CD>ARTIST>,Gary More
               1,N,E,[ ],23,4,ND>CATALOG>CD>COUNTRY>,UK
               1,N,E,[ ],23,4,ND>CATALOG>CD>COMPANY>,Virgin Records
               1,N,E,[ ],23,4,ND>CATALOG>CD>PRICE>,10.20
               2,N,E,[ ],23,4,ND>CATALOG>CD>YEAR>,1990
                         40
```

FIG. 2

/ Catalog / CD / Title  /330
/ Catalog / CD / Title / Empire Burlesque  /332
/ CD / Title  /334
Empir*  /336
*pire  /338

350 Start
352 Receiving a query
354 When the query is a fully qualified query, transforming the target to form a fully qualified hashing code
356 Performing an associative lookup in a map index using the fully qualified hashing code
358 Returning a map offset
360 Returning a data couplet
362 End

510

516   512                514                        518
<Title> "Greatest Hits" AND, "Dolly Parton" : Converging @<CD>

*550*

```
1   <Phonebook country=USA>
2       <Listing category=Residential>
3           <Name>
4               <Last> Brandin </Last>
5               <First> Chris </First>
6           </Name>
7           <Address>
8               <Number> 1234 </Number>
9               <Street> Main Street </Street>
10              <City> Colorado Springs </City>
11              <State> CO </State>
12              <Zip> 80909 </Zip>
13          </Address>
14          <Telephone>
15              <Areacode> 719 </Areacode>
16              <Number> 555-1206 </Number>
17          </Telephone>
18      </Listing>
19      <Listing category=Residential>
20          <Name>
21              <Last> Brandin </Last>
22              <First> Alice </First>
23          </Name>
24          <Address>
25              <Number> 1234 </Number>
26              <Street> Main Street </Street>
27              <City> Colorado Springs </City>
28              <State> CO </State>
29              <Zip> 80909 </Zip>
30          </Address>
31          <Telephone>
32              <Areacode> 719 </Areacode>
33              <Number> 555-1061 </Number>
34          </Telephone>
35      </Listing>
36      <Listing category=Business>
37          <Name> NeoCore </Name>
38          <Address>
39              <Number> 2864 </Number>
40              <Street> South Circle Drive </Street>
41              <Suite> 1200 </Suite>
42              <City> Colorado Springs </City>
43              <State> CO </State>
44              <Zip> 80906 </Zip>
45          </Address>
46          <Telephone>
47              <Areacode> 719 </Areacode>
48              <Number> 576-9780 </Number>
49          </Telephone>
50      </Listing>
51  </Phonebook>
```

Index Entry

582 — #000000002Phonebook>@country>USA     ←552 (584)
586 — #000000002Phonebook>Listing>@category>Residential — 590
588 — #000000002Phonebook>Listing>Name>Last>Brandin
596 — #000000002Phonebook>Listing>Name>First>Chris
000000002Phonebook>Listing>Address>Number>1502
000000002Phonebook>Listing>Address>Street>East Pikes Peak Avenue
000000002Phonebook>Listing>Address>City>Colorado Springs
000000002Phonebook>Listing>Address>State>CO
000000002Phonebook>Listing>Address>Zip>80909
000000002Phonebook>Listing>Telephone>Areacode>719
592 — #000000002Phonebook>Listing>Telephone>Number>555-1206
000000013Phonebook>@country>USA
594 — #000000013Phonebook>Listing>@category>Residential
000000013Phonebook>Listing>Name>Last>Brandin
000000013Phonebook>Listing>Name>First>Alice
000000013Phonebook>Listing>Address>Number>1502
000000013Phonebook>Listing>Address>Street>East Pikes Peak Avenue
000000013Phonebook>Listing>Address>City>Colorado Springs
000000013Phonebook>Listing>Address>State>CO
000000013Phonebook>Listing>Address>Zip>80909
000000013Phonebook>Listing>Telephone>Areacode>719
000000013Phonebook>Listing>Telephone>Number>555-1061
000000024Phonebook>@country>USA
000000024Phonebook>Listing>@category>Business
000000024Phonebook>Listing>Name>NeoCore
000000024Phonebook>Listing>Address>Number>2864
000000024Phonebook>Listing>Address>Street>South Circle Drive
000000024Phonebook>Listing>Address>Suite>1200
000000024Phonebook>Listing>Address>City>Colorado Springs
000000024Phonebook>Listing>Address>State>CO
000000024Phonebook>Listing>Address>Zip>80906
000000024Phonebook>Listing>Telephone>Areacode>719
000000024Phonebook>Listing>Telephone>Number>576-9870

FIG. 23

METHOD OF STORING AND FLATTENING A STRUCTURED DATA DOCUMENT

RELATED APPLICATIONS

This patent claims priority on U.S. provisional patent application Ser. No. 60/240,428, entitled "Management of Duplicate Data Elements in DPP Virtual Associative Memories", filed on Oct. 13, 2000 and provisional patent application Ser. No. 60/243,255, entitled "Alternate Method of Indexing XML Documents", filed Oct. 25, 2000 both of which are assigned to the same assignee as the present patent application.

This patent application is related to the U.S. patent application Ser. No. 09/419,217, entitled "Memory Management System and Method" filed on Oct. 15, 1999, assigned to the same assignee as the present application and the U.S. patent application Ser. No. 09/768,102 entitled "Method of Storing a Structured Data Document" filed on Jan. 23, 2001, assigned to the same assignee as the present application the U.S. patent application Ser. No. 09/767,797 entitled "Method and System for Storing a Flattened Structured Data Document" filed on Jan. 23, 2001, assigned to the same assignee as the present application and the U.S. patent application Ser. No. 09/768,101 entitled "Method Of Performing A Search Of A Numerical Document Object Model" filed on Jan. 23, 2001, assigned to the same assignee as the present application Ser. No. 09/767,493, entitled "Method of Operating an Extensible Markup Language Database" filed on Jan. 23, 2000, assigned to the same assignee as the present application all hereby incorporated by reference.

FIELD OF THE INVENTION

The present invention relates generally to the field of structured data documents and more particularly to a method of operating an extensible markup language (XML and derivatives) database.

BACKGROUND OF THE INVENTION

Structured data documents such as HTML (Hyper Text Markup Language), XML (eXtensible Markup Language) and SGML (Standard Generalized Markup Language) documents and derivatives use tags to describe the data associated with the tags. This has an advantage over databases in that not all the fields are required to be predefined. XML is presently finding widespread interest for exchanging information between businesses. XML appears to provide an excellent solution for internet business to business applications. Unfortunately, XML documents require a lot of memory and therefore are time consuming and difficult to search.

Thus there exists a need for a method of operating an extensible markup language (XML derivatives) database that reduces the memory and speeds up the time to search structured data documents.

BRIEF DESCRIPTION OF THE DRAWINGS

FIG. 1 is an example of an XML document in accordance with one embodiment of the invention;

FIG. 2 is an example of a flattened data document in accordance with one embodiment of the invention;

FIG. 22 is an example of an XML document in accordance with one embodiment of the invention;

FIG. 23 is an example of a flattened data document in accordance with one embodiment of the invention;

DETAILED DESCRIPTION OF THE DRAWINGS

Figure 3:
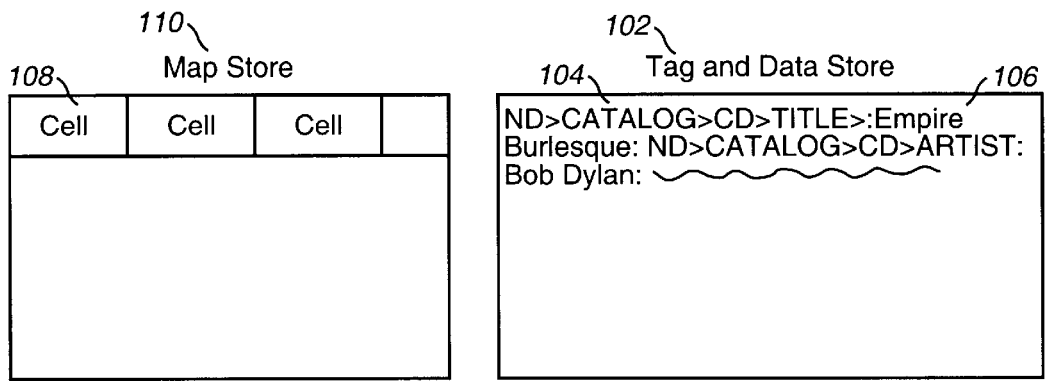
FIG. 3 is a block diagram of a system for storing a flattened data document in accordance with one embodiment of the invention.

A method of flattening a structured data document includes the steps of receiving a structured data document.

Next, a first data entry is searched for by the system. When the first data entry is found, it is determining if an attribute is defined before the first data entry. When the attribute is defined before the first data entry, a first line containing all open tags before the attribute and the attribute is created. A record indicator is stored on the first line.

FIG. 1 is an example of an XML document 10 in accordance with one embodiment of the invention. The words between the < > are tags that describe the data. This document is a catalog 12. Note that all tags are opened and later closed. For instance <catalog> 12 is closed at the end of the document </catalog> 14. The first data item is "Empire Burlesque" 16. The tags <CD> 18 and <TITLE> 20 tell us that this is the title of the CD (Compact Disk). The next data entry is "Bob Dylan" 22, who is the artist. Other compact disks are described in the document.

FIG. 2 is an example of a flattened data document (numerical document object model) 40 in accordance with one embodiment of the invention. The first five lines 42 are used to store parameters about the document. The next line (couplet) 44 shows a line that has flattened all the tags relating to the first data entry 16 of the XML document 10. Note that the tag <ND> 46 is added before every line but is not required by the invention. The next tag is CATALOG> 47 which is the same as in the XML document 10. Then the tag CD> 48 is shown and finally the tag TITLE> 50. Note this is the same order as the tags in the XML document 10. A plurality of formatting characters 52 are shown to the right of each line. The first column is the n-tag level 54. The n-tag defines the number of tags that closed in that line. Note that first line 44, which ends with the data entry "Empire Burlesque" 16, has a tag 24 (FIG. 1) that closes the tag TITLE. The next tag 26 opens the tag ARTIST. As a result the n-tag for line 44 is a one. Note that line 60 has an n-tag of two. This line corresponds to the data entry 1985 and both the YEAR and the CD tags are closed.

The next column 56 has a format character that defines whether the line is first (F) or another line follows it (N-next) or the line is the last (L). The next column contains a line type definition 58. Some of the line types are: time stamp (S); normal (E); identification (I); attribute (A); and processing (P). The next column 62 is a delete level and is enclosed in a parenthesis. When a delete command is received the data is not actually erased but is eliminated by entering a number in the parameters in a line to be erased. So for instance if a delete command is received for "Empire Burlesque" 16, a "1" would be entered into the parenthesis of line 44. If a delete command was received for "Empire Burlesque" 16 and <TITLE>, </TITLE>, a "2" would be entered into the parenthesis. The next column is the parent line 64 of the current line. Thus the parent line for the line 66 is the first line containing the tag CATALOG. If you count the lines you will see that this is line five (5) or the preceding line. The last column of formatting characters is a p-level 68. The p-level 68 is the first new tag opened but not closed. Thus at line 44, which corresponds to the data entry "Empire Burlesque" 16, the first new tag opened is CATALOG. In addition the tag CATALOG is not closed. Thus the p-level is two (2).

FIG. 3 is a block diagram of a system 100 for storing a flattened data document in accordance with one embodiment of the invention. Once the structured data document is flattened as shown in FIG. 2, it can be stored. Each unique tag or unique set of tags for each line is stored to a tag and data store 102. The first entry in the tag and data store is ND>CATALOG>CD>TITLE> 104. Next the data entry "Empire Burlesque" 106 is stored in the tag and data store 102. The pointers to the tag and data entry in the tag and data store 102 are substituted into line 44. Updated line 44 is then stored in a first cell 108 of the map store 110. In one embodiment the tag store and the data store are separate. The tag and data store 102 acts as a dictionary, which reduces the required memory size to store the structured data document. Note that the formatting characters allow the structured data document to be completely reconstructed.

Figure 4:
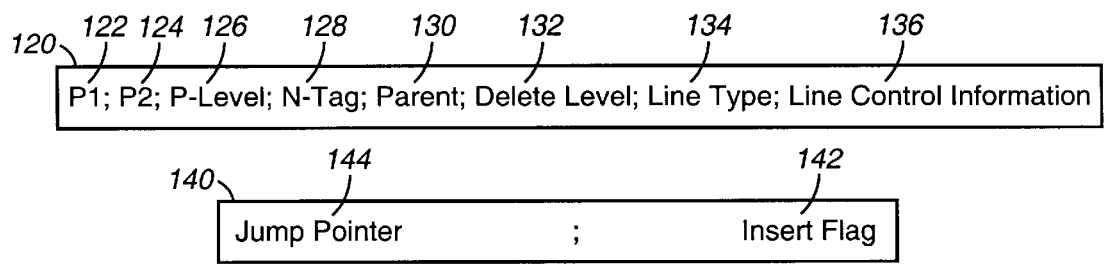
FIG. 4 shows two examples of a map store cell in accordance with one embodiment of the invention.

FIG. 4 shows two examples of a map store cell in accordance with one embodiment of the invention. The first example 120 works as described above. The cell (couplet) 120 has a first pointer ($P_1$) 122 that points to the tag in the tag and data store 102 and a second pointer ($P_2$) 124 that points to the data entry. The other information is the same as in a flattened line such as: p-level 126; n-tag 128; parent 130; delete level 132; line type 134; and line control information 136. The second cell type 140 is for an insert. When an insert command is received a cell has to be moved. The moved cell is replaced with the insert cell 140. The insert cell has an insert flag 142 and a jump pointer 144. The moved cell and the inserted cell are at the jump pointer.

Figure 5:
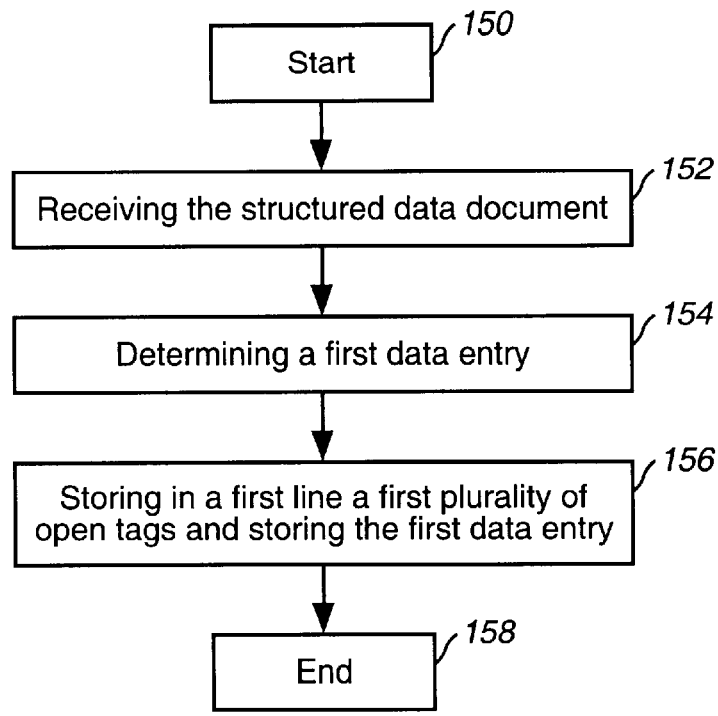
FIG. 5 is a flow chart of a method of storing a structured data document in accordance with one embodiment of the invention.

FIG. 5 is a flow chart of a method of storing a structured data document. The process starts, step 150, by receiving the structured data document at step 152. A first data entry is determined at step 154. In one embodiment, the first data entry is an empty data slot. At step 156 a first plurality of open tags and the first data entry is stored which ends the process at step 158. In one embodiment a level of a first opened tag is determined. The level of the first opened tag is stored. In another embodiment, a number of consecutive tags closed after the first data entry is determined. This number is then stored. A line number is stored.

In one embodiment, a next data entry is determined. A next plurality of open tags proceeding the next data entry is stored. These steps are repeated until a next data entry is not found. Note that the first data entry may be a null. A plurality of format characters associated with the next data entry are also stored. In one embodiment the flattened data document is expanded into the structured data document using the plurality of formatting characters.

Figure 6:
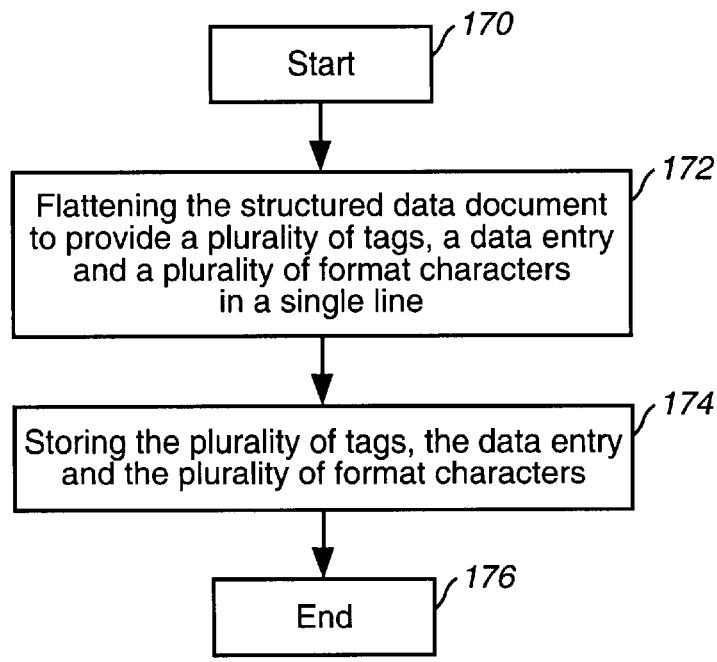
FIG. 6 is a flow chart of a method of storing a structured data document in accordance with one embodiment of the invention.

FIG. 6 is a flow chart of a method of storing a structured data document. The process starts, step 170, by flattening the structured data document to a provide a plurality of tags, a data entry and a plurality of format characters in a single line at step 172. At step 174 the plurality of tags, the data entry and the plurality of format characters are stored which ends the process at step 176. In one embodiment, the plurality of tags are stored in a tag and data store. In addition, the plurality of format characters are stored in map store. The data entry is stored in the tag and data store. A first pointer in the map store points to the plurality of tags in the tag and data store. A second pointer is stored in the map store that points to the data store. In one embodiment, the structured data document is received. A first data entry is determined. A first plurality of open tags preceding the first data entry and the first data entry are placed in a first line. A next data entry is determined. A next plurality of open tags proceeding the next data entry is placed in the next line. These steps are repeated until a next data entry is not found. In one embodiment a format character is placed in the first line. In one embodiment the format character is a number that indicates a level of a first tag that was opened. In one embodiment the format character is a number that indicates a number of tags that are consecutively closed after the first data entry. In one embodiment the format character is a number that indicates a line number of a parent of a lowest level tag. In one embodiment the format character is a number that indicates a level of a first tag that was opened but not closed. In one embodiment the format character is a character that indicates a line type. In one embodiment the format character indicates a line control information. In one embodiment the structured data document is an extensible markup language document. In one embodiment the next data entry is placed in the next line.

Figure 7:
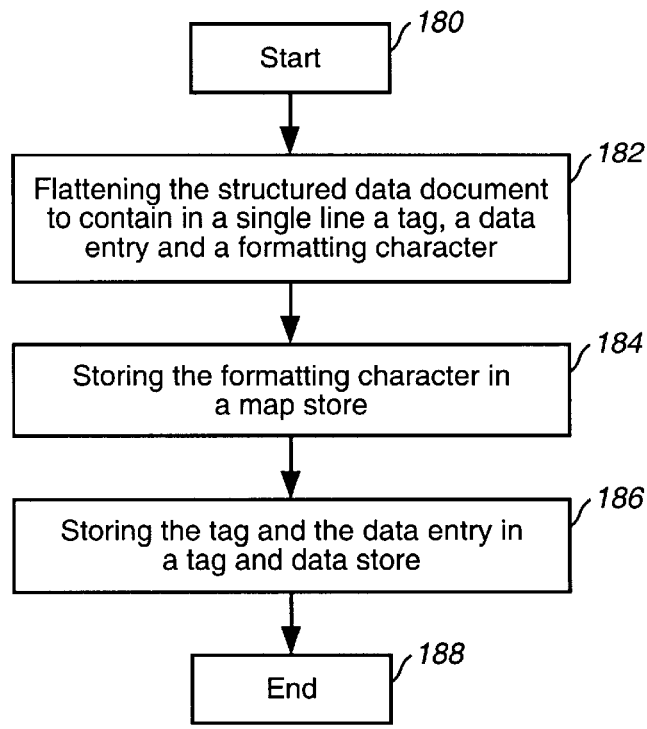
FIG. 7 is a flow chart of a method of storing a structured data document in accordance with one embodiment of the invention.

FIG. 7 is a flow chart of a method of storing a structured data document. The process starts, step 180, by flattening the structured data document to contain in a single line a tag, a data entry and a formatting character at step 182. The formatting character is stored in a map store at step 184. At step 186 the tag and the data entry are stored in a tag and data store which ends the process at step 188. In one embodiment a first pointer is stored in the map store that points to the tag in the tag and data store. A second pointer is stored in the map store that points to the data entry in the tag and data store. In one embodiment a cell is created in the map store for each of the plurality of lines in a flattened document. A request is received to delete one of the plurality of data entries. The cell associated with the one of the plurality of data entries is determined. A delete flag is set. Later a restore command is received. The delete flag is unset. In one embodiment, a request to delete one of a plurality of data entries and a plurality of related tags is received. A delete flag is set equal to the number of the plurality of related tags plus one. In one embodiment, a request is received to insert a new entry. A previous cell containing a proceeding data entry is found. The new entry is stored at an end of the map store. A contents of the next cell is moved after the new entry. An insert flag and a pointer to the new entry is stored in the next cell. A second insert flag and second pointer is stored after the contents of the next cell.

Thus there has been described a method of flattening a structured data document to form a numerical document object model (DOM). The process of flattening the structured data document generally reduces the number of lines used to describe the document. The flattened document is then stored using a dictionary to reduce the memory required to store repeats of tags and data. In addition, the dictionary (tag and data store) allows each cell in the map store to be a fixed length. The result is a compressed document that requires less memory to store and less bandwidth to transmit.

Figure 8:
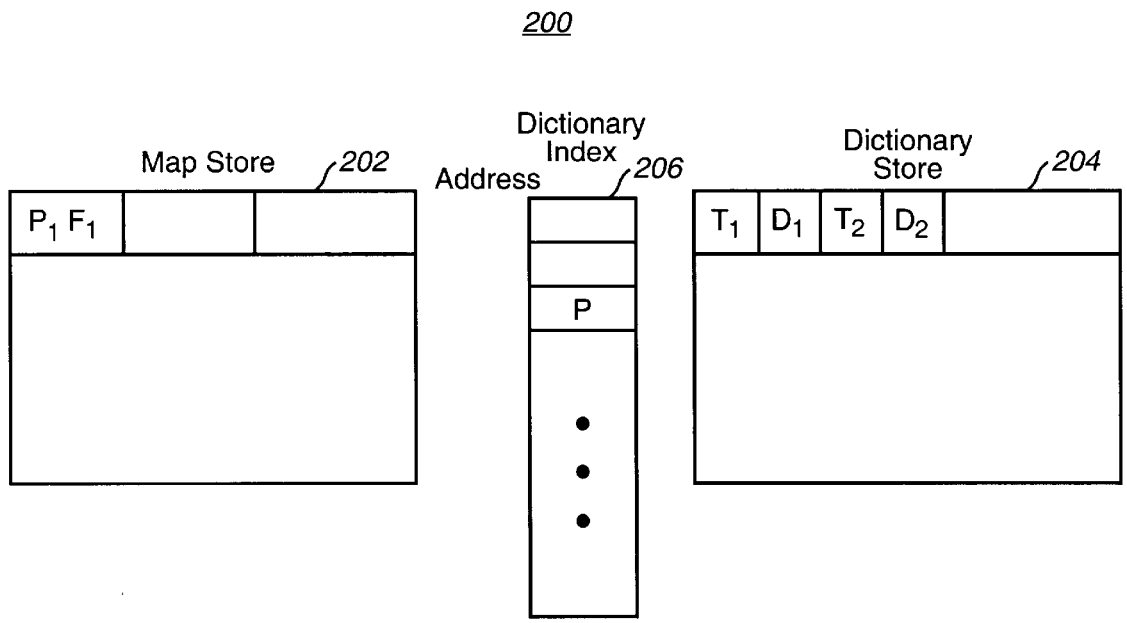
FIG. 8 is a block diagram of a system for storing a flattened structured data document in accordance with one embodiment of the invention.

FIG. 8 is a block diagram of a system 200 for storing a flattened structured data document (numerical DOM) in accordance with one embodiment of the invention. The system 200 has a map store 202, a dictionary store 204 and a dictionary index 206. Note that this structure is similar to the system of FIG. 3. The dictionary store 204 has essentially the same function as the map and tag store (FIG. 3) 102. The difference is that a dictionary index 206 has been added. The dictionary index 206 is an associative index. An associative index transforms the item to be stored, such as a tag, tags or data entry, into an address. Note that in one embodiment the transform returns an address and a confirmer as explained in the U.S. patent application Ser. No. 09/419,217, entitled "Memory Management System and Method" filed on Oct. 15, 1999, assigned to the same assignee as the present application and hereby incorporated by reference. The advantage of the dictionary index 206 is that when a tag or data entry is received for storage it can be easily determined if the tag or data entry is already stored in the dictionary store 204. If the tag or data entry is already in the dictionary store the offset in the dictionary can be immediately determined and returned for use as a pointer in the map store 202.

Figure 9:
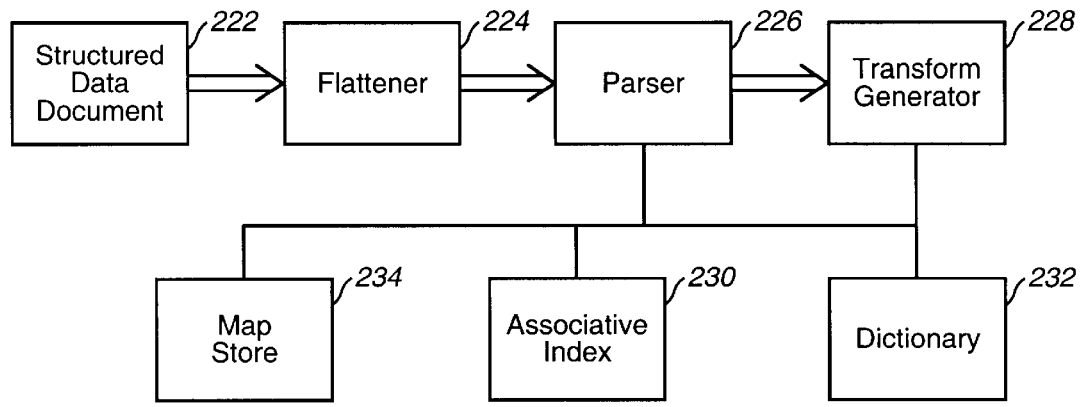
FIG. 9 is a block diagram of a system for storing a flattened structured data document in accordance with one embodiment of the invention.

FIG. 9 is a block diagram of a system 220 for storing a flattened structured data document (numerical DOM) in accordance with one embodiment of the invention. A structured data document 222 is first processed by a flattener 224. The flattener 224 performs the functions described with respect to FIGS. 1 & 2 to form a numerical DOM. A parser 226 then determines the data entries and the associated tags. One of the data entries is transformed by the transform generator 228. This is used to determine if the data entry is in the associative index 230. When the data entry is not in the associative index 230, it is stored in the dictionary 232. A pointer to the data in the dictionary is stored at the appropriate address in the associative index 230. The pointer is also stored in a cell of the map store 234 as part of a flattened line.

Figure 10:
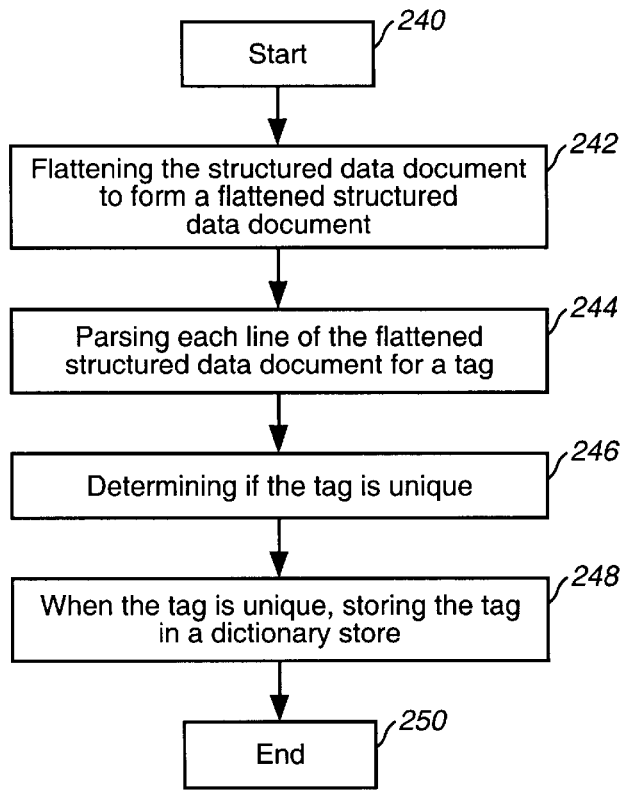
FIG. 10 is a flow chart of the steps used in a method of storing a flattened structured data document in accordance with one embodiment of the invention.

FIG. 10 is a flow chart of the steps used in a method of storing a flattened structured data document (numerical DOM) in accordance with one embodiment of the invention. The process starts, step 240, by flattening the structured data document to form a flattened structured data document (numerical DOM) at step 242. Each line of the flattened structured data document is parsed for a tag at step 244. Next it is determined if the tag is unique at step 246. When the tag is unique, step 248, the tag is stored in a dictionary store which ends the process at step 250. In one embodiment a tag dictionary offset is stored in the map store. A plurality of format characters are stored in the map store. When a tag is not unique, a tag dictionary offset is determined. The tag dictionary offset is stored in the map store.

In one embodiment, the tag is transformed to form a tag transform. An associative lookup is performed in a dictionary index using the tag transform. A map index is created that has a map pointer that points to a location in the map store of the tag. The map pointer is stored at an address of the map index that is associated with the tag transform.

Figure 11:
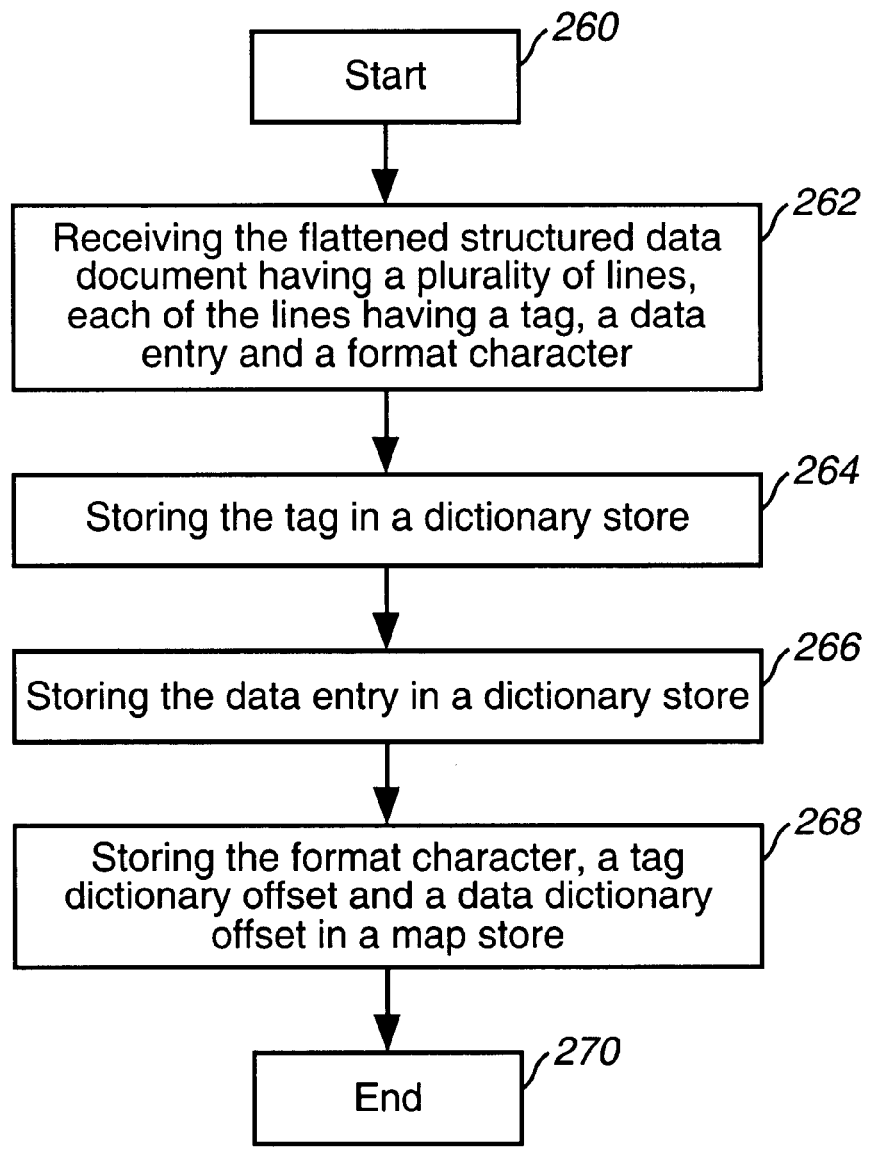
FIG. 11 is a flow chart of the steps used in a method of storing a flattened structured data document in accordance with one embodiment of the invention.

FIG. 11 is a flow chart of the steps used in a method of storing a flattened structured data document (numerical DOM) in accordance with one embodiment of the invention. The process starts, step 260, by receiving the flattened structured data document (numerical DOM) that has a plurality of lines (couplets) at step 262. Each of the plurality of lines contains a tag, a data entry and a format character. The tag is stored in a dictionary store at step 264. The data entry is stored in the dictionary store at step 266. At step 268 the format character, a tag dictionary offset and a data dictionary offset are stored in a map store which ends the process at step 270. In one embodiment, the tag is transformed to form a tag transform. The tag dictionary offset is stored in a dictionary index at an address pointed to by the tag transform. In one embodiment, it is determined if the tag is unique. When the tag is unique, the tag is stored in the dictionary store otherwise the tag is not stored (again) in the dictionary store. To determine if the tag is unique, it is determined if a tag pointer is stored in the dictionary index at an address pointed to by the tag transform.

In one embodiment, the data entry is transformed to form a data transform. The data dictionary offset is stored in the dictionary index at an address pointed to by the data transform. In one embodiment each of the flattened lines has a plurality of tags.

In one embodiment, a map index is created. Next it is determined if the tag is unique. When the tag is unique, a pointer to a map location of the tag is stored in the map index. When the tag is not unique, it is determined if a duplicates flag is set. When the duplicates flag is set, a duplicates count is incremented. When the duplicates flag is not set, the duplicates flag is set. The duplicates count is set to two. In one embodiment a transform of the tag with an instance count is calculated to form a first instance tag transform and a second instance tag transform. A first map pointer is stored in the map index at an address associated with the first instance transform. A second map pointer is stored in the map index at an address associated with the second instance transform.

In one embodiment a transform of the tag with an instances count equal to the duplicates count is calculated to form a next instance tag transform. A next map pointer is stored in the map index at an address associated with the next instance transform.

In one embodiment, a map index is created. Next it is determined if the data entry is unique. When the data entry is unique, a pointer to a map location of the tag is stored.

Thus there has been described an efficient manner of storing a structured data document that requires significantly less memory than conventional techniques. The associative indexes significantly reduces the overhead required by the dictionary.

Figure 12:
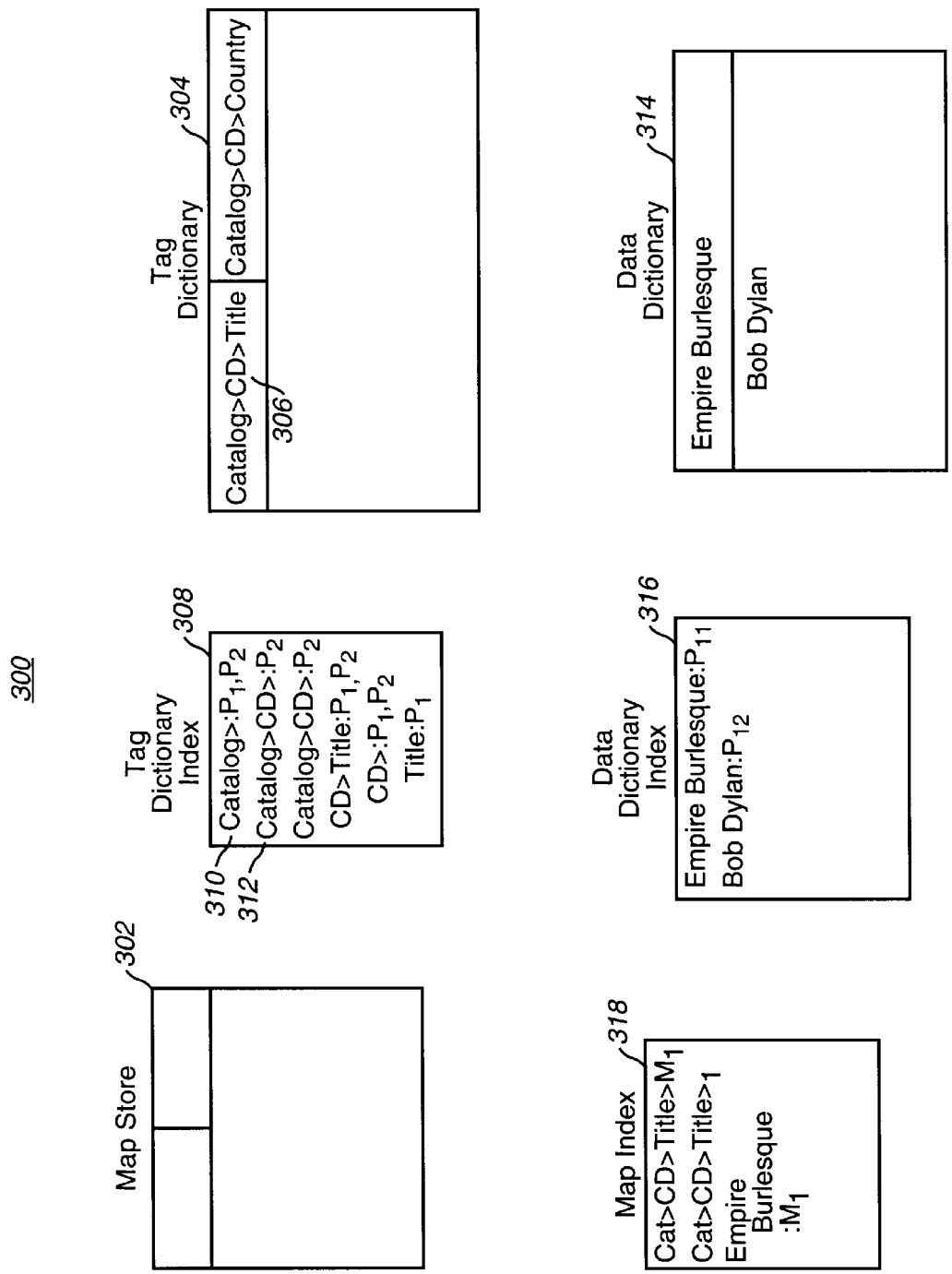
FIG. 12 is a schematic diagram of a method of storing a numerical document object model in accordance with one embodiment of the invention.

FIG. 12 is a schematic diagram of a method of storing a numerical document object model in accordance with one embodiment of the invention. This is similar to the models described with respect to FIGS. 3 & 8. The couplets (flattened lines) are stored in the map store 302. A tag dictionary 304 stores a copy of each unique tag string. For instance, the tag string CATALOG>CD>TITLE> 306 from line 44 (see FIG. 2) is stored in the tag dictionary 304. Note that the tag ND> is associated with every line and therefor has been ignored for this discussion. A tag dictionary index 308 is created. Every tag, incomplete tag string and complete tag string is indexed. As a result the tag CATALOG> 310, CATALOG>CD> 312 and every other permutation is stored in the tag index 308. Since a tag may occur in multiple entries it may have a number of pointers associated with the tag in the index.

A data dictionary 314 stores a copy of each unique data entry such as "Bob Dylan". A data dictionary index 316 associates each data entry with its location in the dictionary. In one embodiment, the tag dictionary index and the data dictionary index are associative memories. Thus a mathematical transformation of the entry such as "Bob Dylan" provides the address in the index where a pointer to the entry is stored. In addition to the tag and data indices a map index 318 is created. The map index 318 contains an entry for every complete tag string (see string 306) and the complete tag string and associated data entry. Note that the map index may be an associative index. By creating these indices and dictionaries it is possible to quickly and efficiently search a structured data document. In addition, once the document is in this form it is possible to search for a data entry without ever having to look at the original document.

Figures 13, 14:
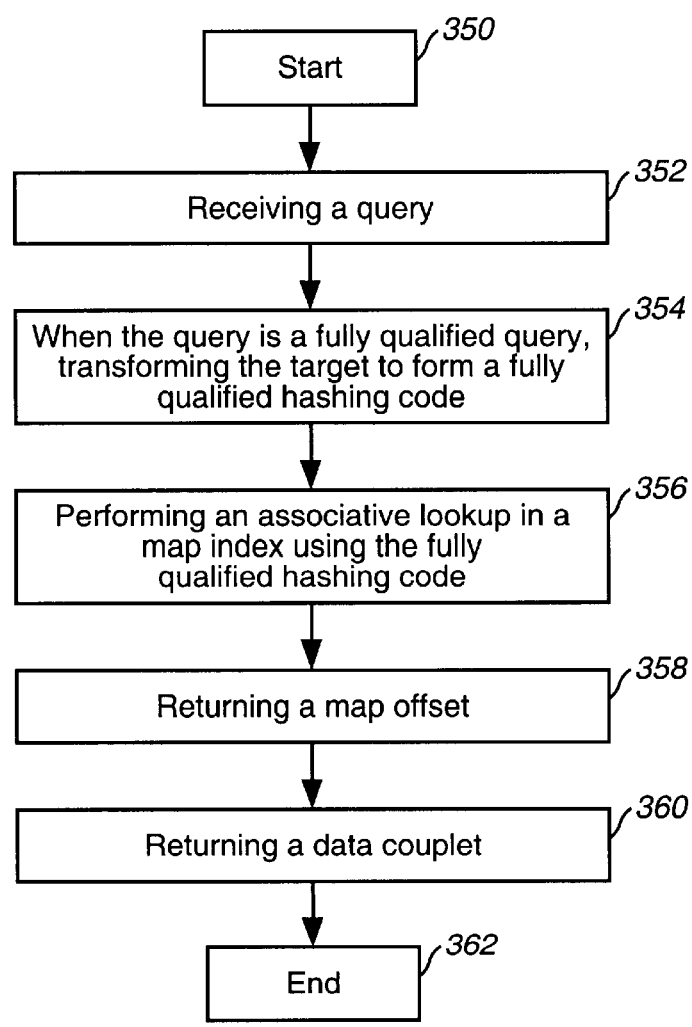
FIG. 13 shows several examples of search queries of a numerical document object model in accordance with one embodiment of the invention.
FIG. 14 is a flow chart of the steps used in a method of performing a search of a numerical document object model in accordance with one embodiment of the invention.

FIG. 13 shows several examples of search queries of a numerical document object model in accordance with one embodiment of the invention. The first example 330 is a fully qualified query since a complete tag string has been specified. The second example 332 is also a fully qualified query since a complete tag string and a complete data entry have been specified. The third example is a not fully qualified query since a partially complete tag string has been specified. The fourth 336 and fifth 338 examples are also examples of a not fully qualified query since the data entry is not complete. Note that the * stands for any wild card. If the data entry were completely specified, the query would be fully qualified.

FIG. 14 is a flow chart of the steps used in a method of performing a search of a numerical document object model in accordance with one embodiment of the invention. The process starts, step 350, by receiving a query at step 352. When the query is a fully qualified query, the target is transformed to form a fully qualified hashing code at step 354. Note the phrase "fully qualified hashing code" means the hashing code for the target of a fully qualified query. In one embodiment the hashing code is a mathematical transformation of the target to produce an address and a confirmer as explained in the U.S. patent application Ser. No. 09/419, 217, entitled "Memory Management System and Method" filed on Oct. 15, 1999, assigned to the same assignee as the present application and hereby incorporated by reference. An associative lookup in a map index is performed using the fully qualified at step 356. At step 358, a map offset is returned. At step 360, a data couplet is returned which ends the process at step 362. In one embodiment, an identified couplet of the numerical DOM (as stored in the map) is converted into an XML string. When the query is partially qualified, the target is transformed to form a partially qualified. An associative lookup is performed in a dictionary index using the partially qualified. A partially qualified query is one that does not contain a complete tag or data string, i.e, <TITLE> instead of ND>CATALOG>CD>TITLE>. A dictionary offset is returned. The complete string is located in the dictionary, using the dictionary offset. A pointer is located in a map index using the complete string. The complete reference is located in the numerical DOM using the pointer. The data couplet is converted into a data XML string.

In another embodiment, when the query includes a wildcard target, the dictionary is scanned for the wildcard target. A complete string is returned from the dictionary that contains the wildcard target. A pointer is located in a map index using the complete string. A couplet is located in the numerical DOM using the pointer.

In one embodiment the hashing code is determined using linear feedback shift register operation, such as (but not limited to) a cyclical redundancy code. In another embodiment, the hashing code is determined by using a modulo two polynomial division. In one embodiment, the divisor polynomial is an irreducible polynomial. Other hashing codes may also be used.

Figure 15:
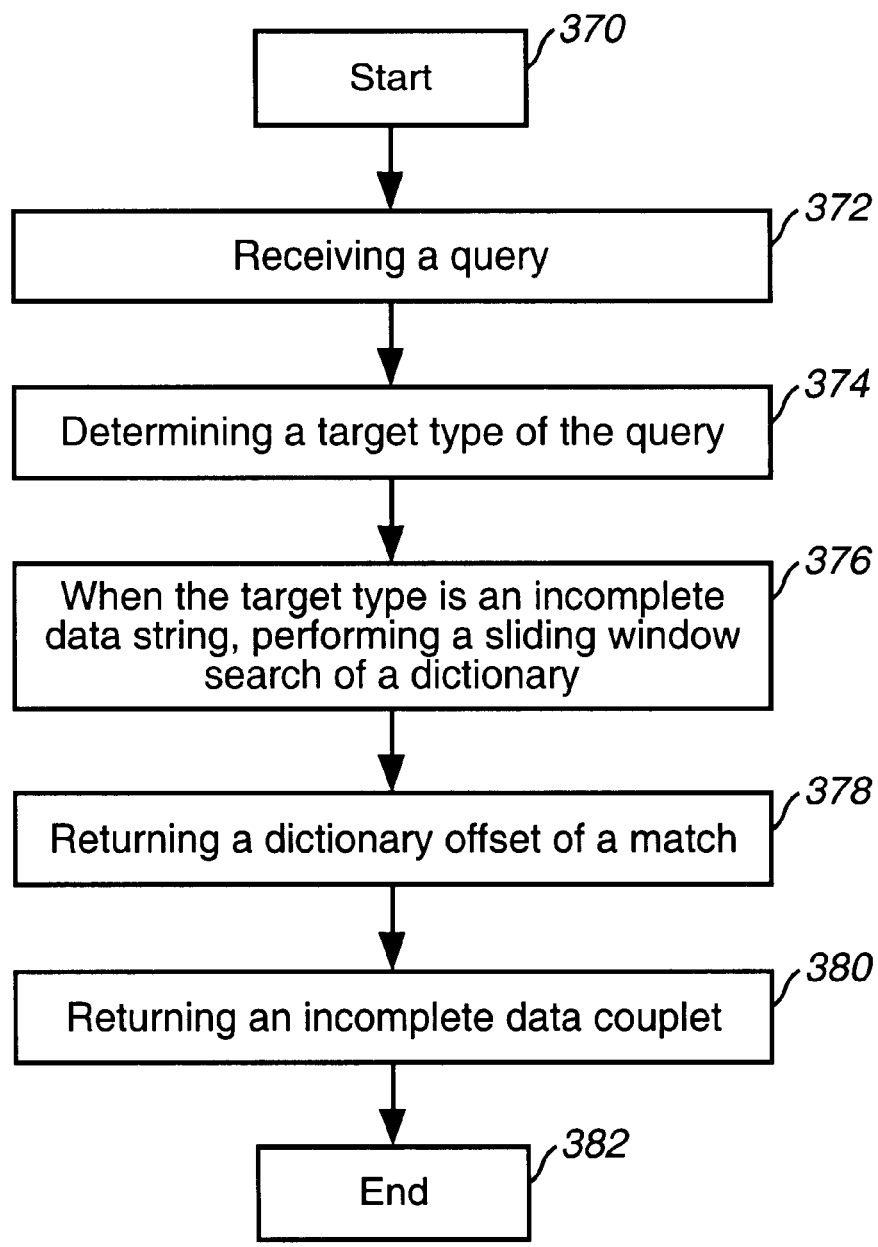
FIG. 15 is a flow chart of the steps used in a method of performing a search of a numerical document object model in accordance with one embodiment of the invention.

FIG. 15 is a flow chart of the steps used in a method of performing a search of a numerical document object model in accordance with one embodiment of the invention. The process starts, step 370, by receiving a query at step 372. A target type of the query is determined at step 374. When the target type is an incomplete data string, a sliding window search of a dictionary is performed at step 376. An incomplete data string could be <Bob> instead of <Bob Dylan>. A dictionary offset of a match is returned at step 378. In one embodiment a plurality of dictionary offsets are returned. At step 380 an incomplete data couplet is returned which ends the process at step 382. When the target type is an incomplete tag and a complete data string, the incomplete tag is transformed to form an incomplete target. An associative lookup in a map index is performed using the incomplete tag. At least one map offset is returned. The complete data string is transformed to form a complete data string. An associative lookup is performed in the map index. A data string map offset is returned. Next, the at least one map offset is compared with the data string map offset.

Figure 16:
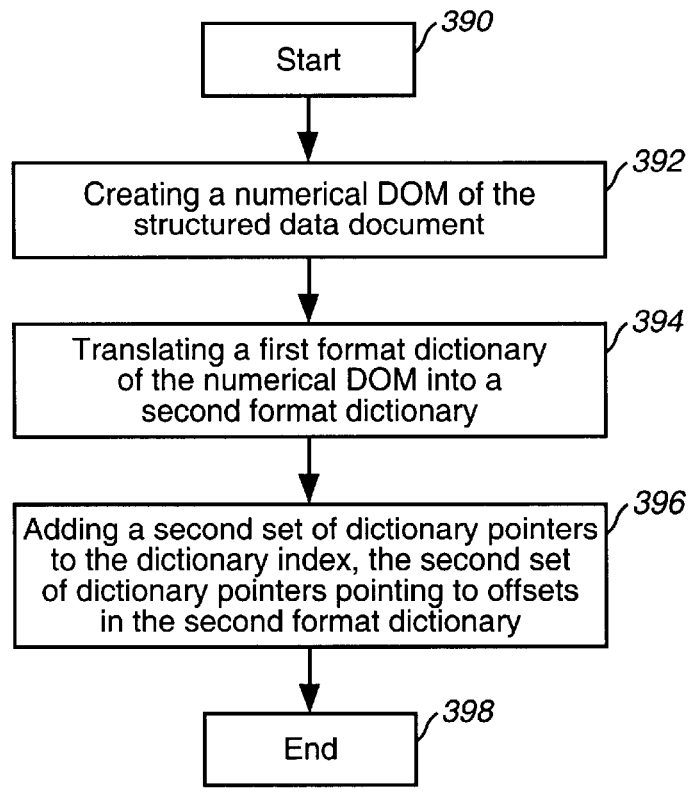
FIG. 16 is a flow chart of the steps used in a method of translating a structured data document in accordance with one embodiment of the invention.

FIG. 16 is a flow chart of the steps used in a method of translating a structured data document in accordance with one embodiment of the invention. The process starts, step

390, by creating a numerical DOM of the structured data document at step 392. A first format dictionary is translated into a second format dictionary at step 394. At step 396 a second set of dictionary pointers are added to the dictionary index. The second set of dictionary pointers point to the offsets in the second format dictionary which ends the process at step 398. In one embodiment, a plurality of dictionary offset pointers are converted to a plurality of dictionary index pointers. This converts the map so it points to the dictionary index rather than the offsets into the dictionary, since there are two dictionaries now.

Figure 17:
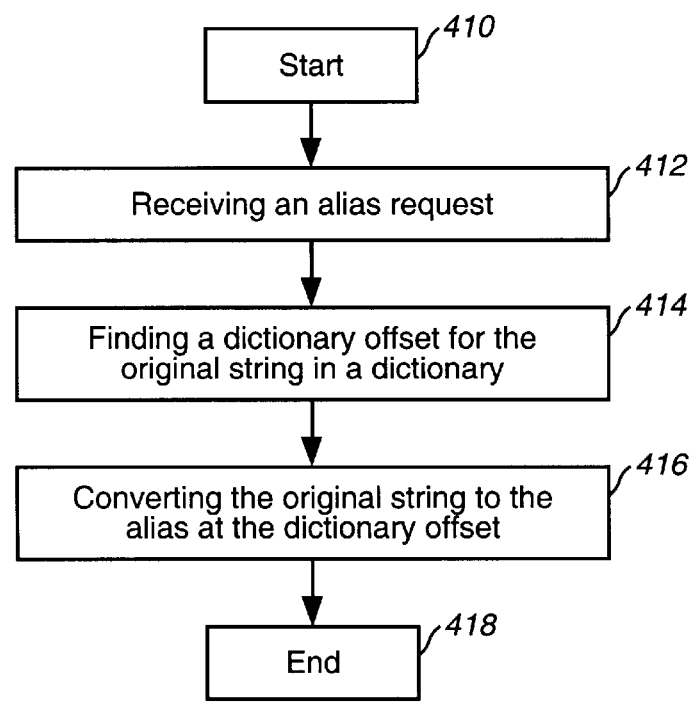
FIG. 17 is a flow chart of the steps used in a method of creating an alias in a numerical document object model in accordance with one embodiment of the invention.

FIG. 17 is a flow chart of the steps used in a method of creating an alias in a numerical document object model in accordance with one embodiment of the invention. The process starts, step 410, by receiving an alias request at step 412. A dictionary offset for the original string in a dictionary is found at step 414. At step 416 the original string is converted to the alias at the dictionary offset which ends the process at step 418. An alias index is created that associates the alias and the original string or the dictionary offset of the original string, and in one embodiment the creation of the alias index includes creating an array that matches the dictionary offset to the original string. In another embodiment, the original string is transformed to form a string. An associative lookup in the dictionary is performed to find the dictionary offset.

A method of performing a search of a numerical document object model begins when the system receives a query. The query is transformed to form a fully qualified. An associative lookup is performed in a map index using the fully qualified. Finally, a map offset is returned. In one embodiment, an identified couplet of the numerical DOM is converted into an XML string. In another embodiment, it is determined if the target is a complete data string. When the target is a complete data string, the complete data string is transformed to form a complete. An associative lookup is performed in a dictionary index using the complete data. A dictionary offset is returned. The numerical DOM is scanned for the dictionary offset, and a data couplet is returned. In another embodiment the data couplet is converted into a data XML string. In another embodiment, the system determines if the target is a wildcard data string. When the target is the wildcard data string, performing a sliding window search of a dictionary. The system returns a dictionary offset of a match and scans the numerical DOM for the dictionary offset. An incomplete data couplet is returned.

Figure 18:
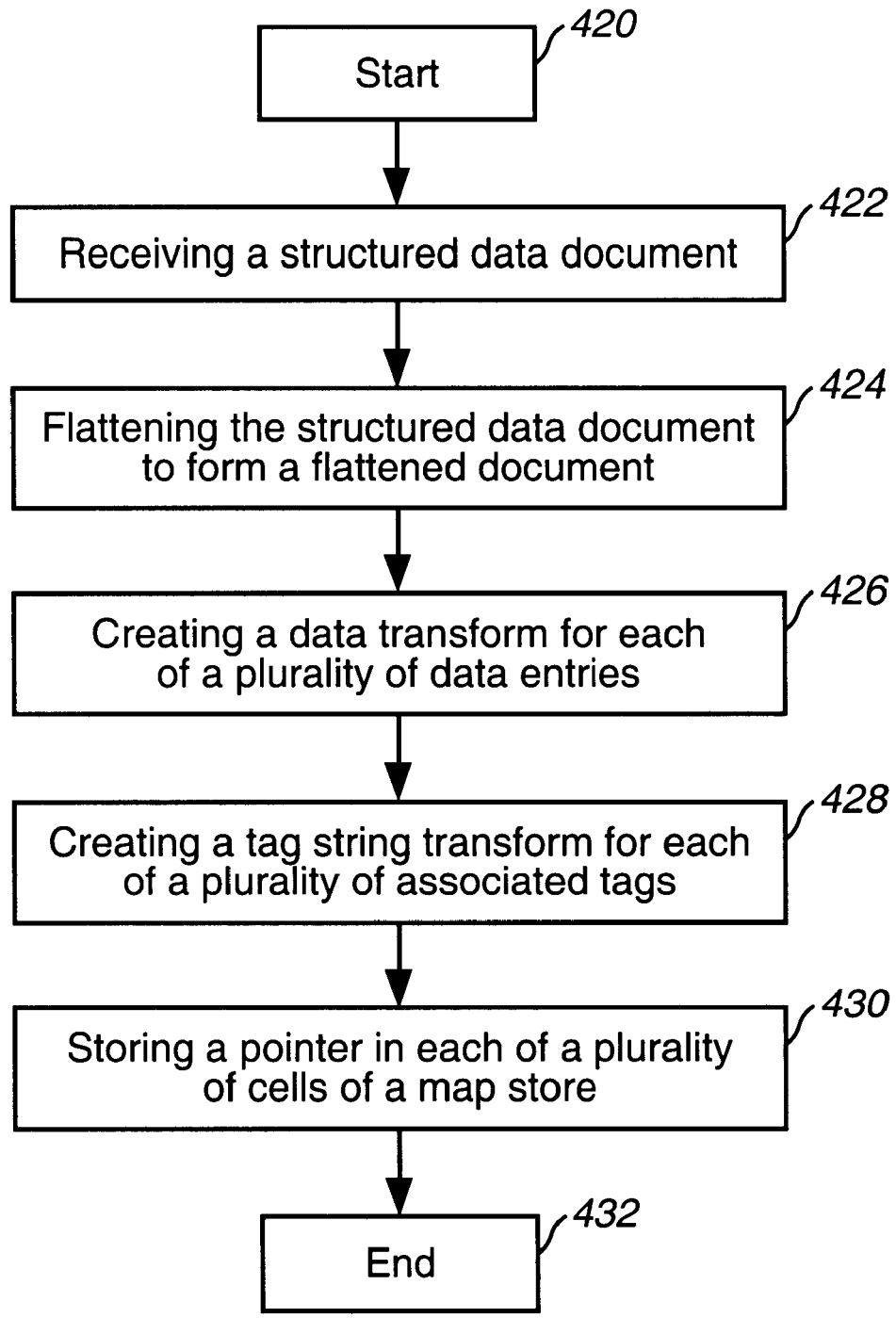
FIG. 18 is a flow chart of the steps used in a method of operating an XML database in accordance with one embodiment of the invention.

FIG. 18 is a flow chart of the steps used in a method of operating an XML database in accordance with one embodiment of the invention. The process starts, step 420, by receiving a structured data document at step 422. The structured data document is flattened to form a flattened document at step 424. At step 426 a data transform is created for each of a plurality of data entries. A tag string transform is created for each of a plurality of associated tags at step 428. At step 430 a pointer is stored in each of a plurality of cells of a map store which ends the process at step 432.

In one embodiment, a plurality of data entries and a plurality of tag entries are determined when the document is flattened. In another embodiment, the system stores a copy of each unique data entry in a data dictionary and then correlates the data transform to a data dictionary pointer in an associative data dictionary index. In another embodiment, first and second data dictionaries are created. The first and second data dictionaries are used to store first and second language copies of each unique data entry, respectively. The languages may be a computer-oriented format, such as ASCII or rich text, or the languages may be human, such as English or French. The data transform is correlated to a pair of dictionary pointers in the associative data dictionary index. A copy of each unique tag string is stored in a tag dictionary and the tag string transform is correlated to a tag dictionary pointer in an associative tag dictionary index. In another embodiment, first and second tag dictionaries are created. The first and second tag dictionaries are used to store first and second language copies of each unique tag entry, respectively. The tag transform is correlated to a pair of dictionary pointers in the associative tag dictionary index. Next an original entry and an alias entry are cross-referenced in an alias index.

In another embodiment, the system receives a search query. It is determined whether the search query contains a fully qualified target. When the search query does contain the fully qualified target, the fully qualified target is transformed to form a fully qualified transform. Next, a target pointer is received from the associative map index using the fully qualified transform, and the data couplet pointed to by the target pointer is read.

In another embodiment, the search query does not contain the fully qualified target. The partially qualified target is transformed to form a partially qualified transform. The system performs an associative lookup in the associative tag dictionary index using the partially qualified transform. The system returns a tag dictionary offset for the partially qualified transform, and a complete tag string is located in the tag dictionary. Next, the system receives a target pointer for the partially qualified transform, and the system reads the data couplet pointed to by the target pointer.

In another embodiment, the system receives an alias command containing an original element and an alias element, and an alias pointer is stored in an address of the alias index that is associated with the original entry. The alias element is transformed to form an alias transform and it is determined if the alias pointer is associated with the alias transform in the data dictionary index or the associative tag dictionary index. When the alias pointer is not associated with the alias transform, the alias element is stored in either the data dictionary or the tag dictionary and the alias pointer is returned. When the alias pointer is associated with the alias transform, the alias pointer is returned.

In another embodiment, the system receives a print command requesting a portion of the structured data document be printed in the second language. The system retrieves a first couplet from the portion of the map store and expands the first couplet using the second language data dictionary and the second language tag dictionary.

Figure 19:
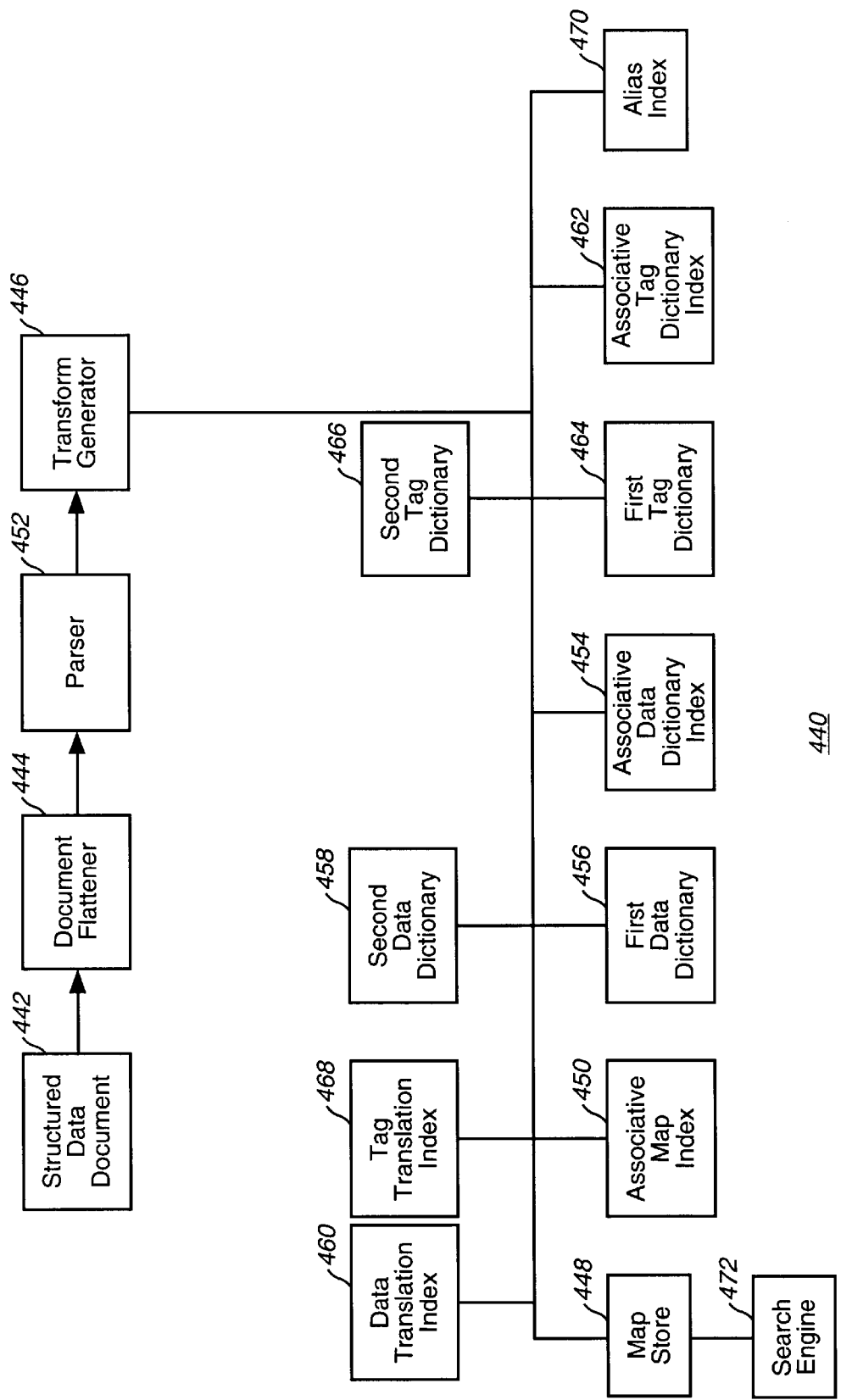
FIG. 19 is a block diagram of a system for operating an XML database in accordance with one embodiment of the invention.

FIG. 19 is a block diagram of a system 440 for operating an XML and derivatives database in accordance with one embodiment of the invention. The system 440 receives a structured data document 442 at the document flattener 444. The document flattener 444 sends the flattened document to the transform generator 446, which creates a data transform for each of a plurality of data entries and a tag string transform for a plurality of associated tags. A map store 448 is connected to the transform generator and has a plurality of cells, each containing the data transform, the tag string transform and a format character. An associative map index 450 has a plurality of map addresses, each of the plurality of addresses having a pointer to the map store 448.

In one embodiment, the parser 452 receives the flattened document from the document flattener 444 and determines the plurality of data entries and the plurality of associated tags. In another embodiment, a data dictionary stores a copy of each unique data entry, and an associative data dictionary index 454 has a plurality of data addresses that correlates the data transform to a dictionary pointer.

In another embodiment, the data dictionary includes a first data dictionary 456 and a second data dictionary 458. The second data dictionary 458 stores the copy of each unique data entry in a second format. A data translation index 460 points to the first data dictionary 456 or the second data dictionary 458.

In another embodiment, a tag dictionary stores a copy of each unique tag string, and an associative tag dictionary index 462 has a plurality of tag addresses that correlates the tag string transform to a tag dictionary pointer. The tag dictionary includes a first tag dictionary 464 and a second tag dictionary 466, and the second tag dictionary 466 stores the copy of each unique tag string in a second format. A tag translation index 468 points to the first tag dictionary 464 or the second tag dictionary 466.

In another embodiment, an alias index 470 cross-references an original entry and an alias entry, and a search engine 472 is connected to the map store 448.

Figure 20A:
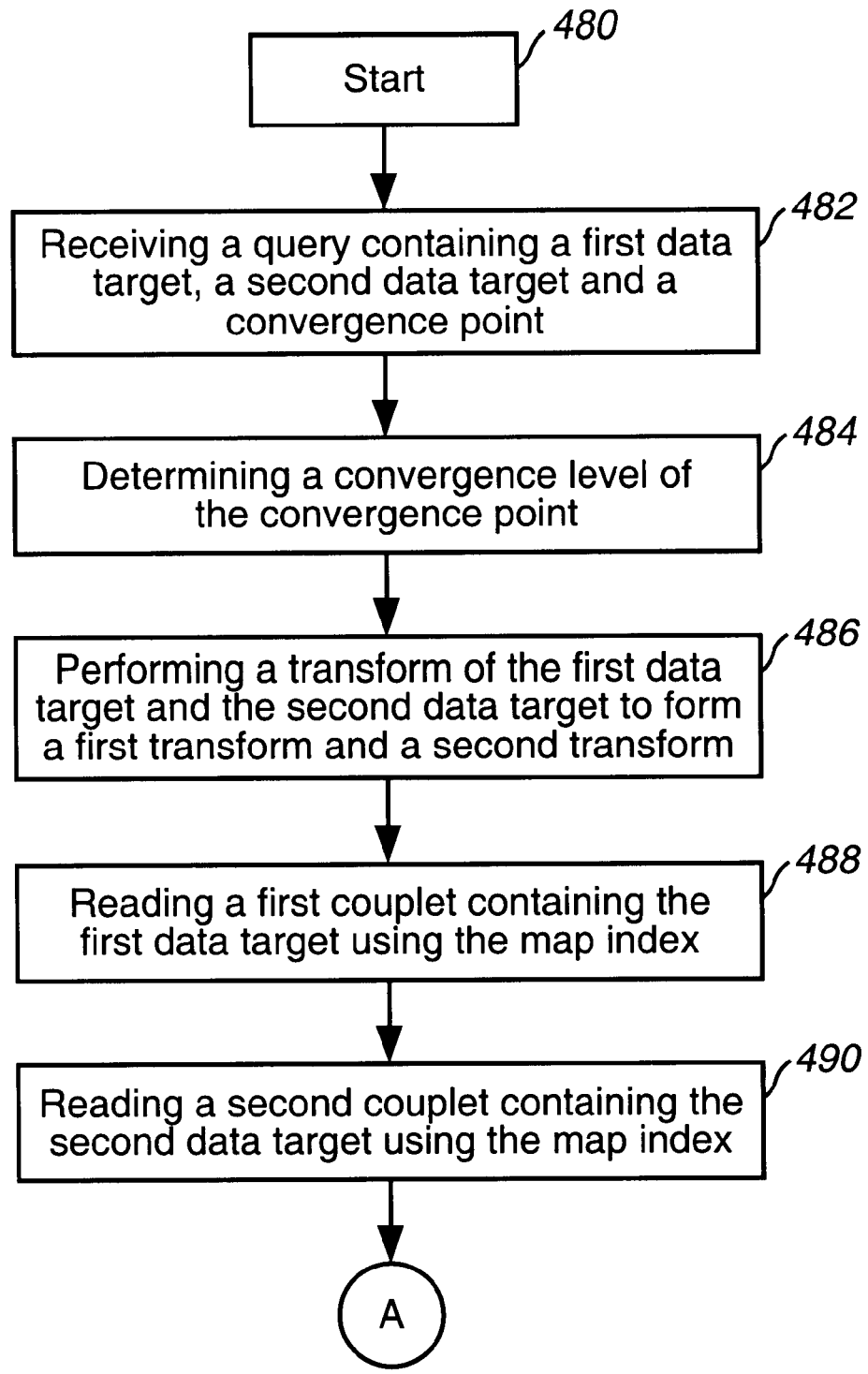
FIGS. 20A, B, and C are a flow chart of the steps used in a method of performing a search of an XML database in accordance with one embodiment of the invention.
Figure 20B:
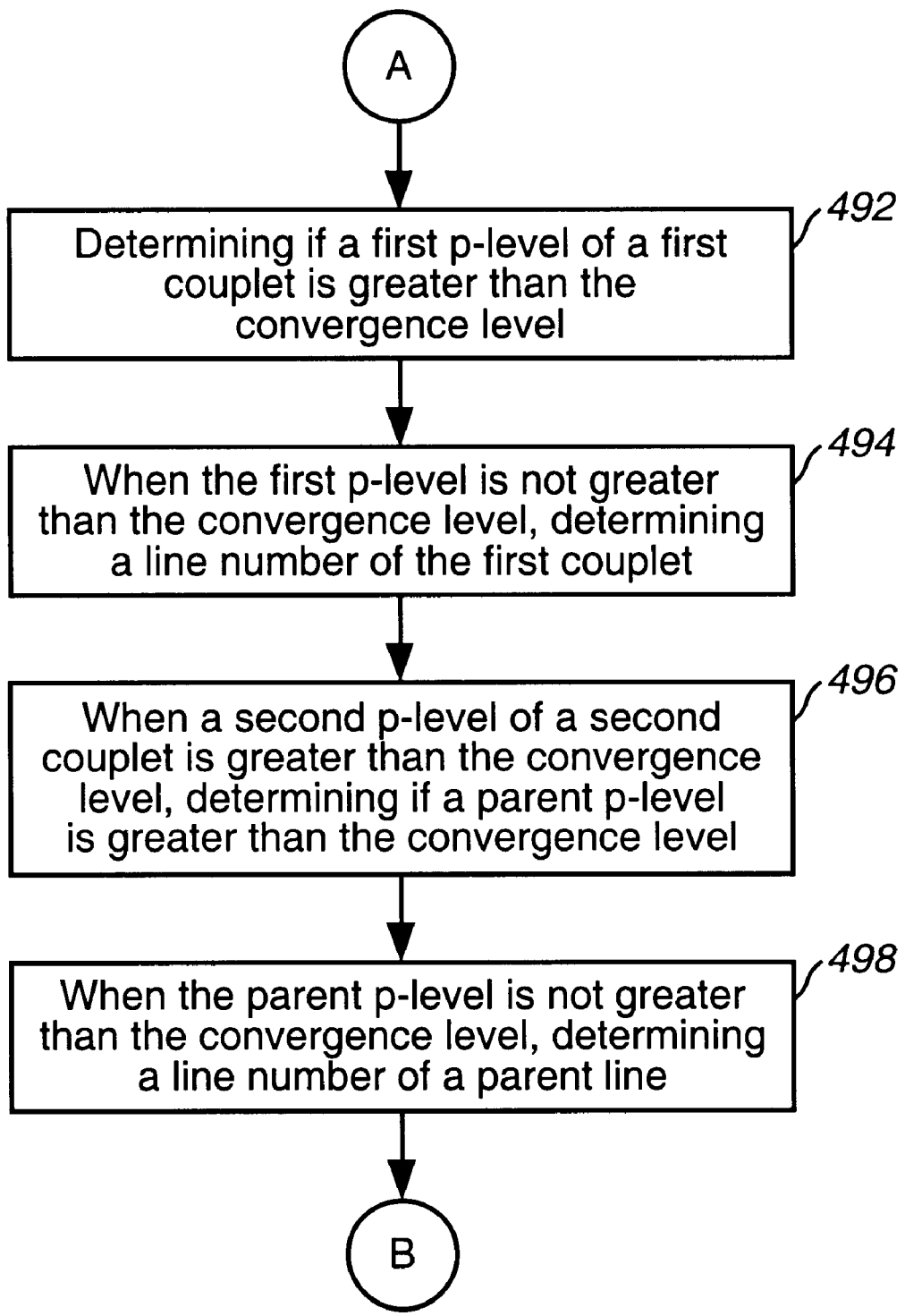

FIGS. 20A, B, and C are a flow chart of the steps used in a method of performing a search of an XML database in accordance with one embodiment of the invention. The process starts, step 480, when the system receives a query containing a first data target, a second data target and a convergence point at step 482. At step 484 the system determines a convergence level of the convergence point. The system performs a transform of the first data target and the second data target to form a first transform and a second transform at step 486, and at step 488 reads a first couplet containing the first data target using the map index. At step 490 the system reads a second couplet containing the second data target using the map index, and at step 492 it determines if a first p-level of a first couplet is greater than the convergence level, and when the first p-level is not greater than the convergence level, the system determines a line number for the first couplet at step 494. At step 496, when a second p-level of a second couplet is greater than the convergence level, the system determines if a parent p-level is greater than the convergence level, and when the parent p-level is not greater than the convergence level, the system determines a line number of a parent line at step 498. At step 500, when the line number of the parent is equal to the line number of the first couplet, the system determines if a match is found, which ends the process at step 502.

In one embodiment, when the line number of the parent is not equal to the line number of the first couplet, the system determines that the match is not found. In another embodiment, when the first p-level is greater than the convergence level, scanning the successive parents to find a parent line with a parent p-level not greater than the convergence level. Next, the system determines is the line number of the parent line of the second couplet is equal to a line number of the parent line of the first couplet, and when the line numbers are equal, the system determines that a match had been found.

Figures 20C, 21:
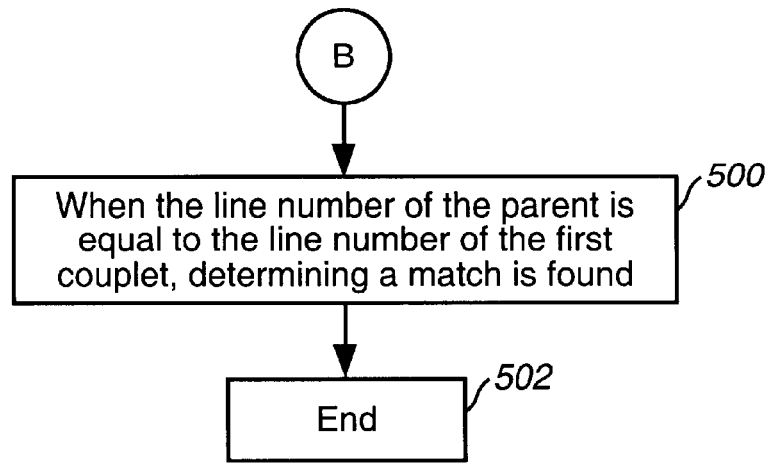
FIG. 21 is an example of a convergence search query in accordance with one embodiment of the invention.

FIG. 21 is an example of a search query 510 in accordance with one embodiment of the invention. The search query 510 is searching for "Greatest Hits" 512 and "Dolly Parton" 514 converging at the tag <cd>. The first data entry "Greatest Hits" 512 has a <Title> tag entry 516. The second data entry "Dolly Parton" 514 is partially qualified because it has no tag entry. Referring back to FIG. 2, <cd> is a level 3 tag, and the first and second data entries are found in lines 17 and 18 respectively. Starting with the "Greatest Hits" search parameter on line 17, if the p-level of the line where the search term is located is not greater than the convergence level, the system ceases searching. For line 17, the p-level is 3 and the convergence level is 3, so line converges on itself. Next, the system searches for the second search query term, "Dolly Parton." "Dolly Parton" is found at line 18. The system compares the p-level of line 18, in this instance 4, to the convergence level of the query, in this instance 3. The p-level of line 18 is 4, which is greater than the convergence level, 3. The system moves up to line 18's parent and determines the parent line's p-level. The parent line of line 18 is line 17, in this case. The p-level of the parent line, line 17 is 3, is not greater than the convergence level, 3. Next, the system compares the parent line's line number, 17, to the line number of the first query term, 17. Convergence occurs when these two line numbers are the same. Thus the convergence of "Greatest Hits" and "Dolly Parton" occurs under the tag <cd> at line 17.

Thus there has been described a method of operating an extensible markup language database that is significantly more efficient.

FIG. 22 is an example of an XML document 550 in accordance with one embodiment of the invention. The XML document includes attributes 552, 554, open tags 556, 558 and closed tags 560, 562. A first record 564 in the XML document 550 includes lines 1–18. A second record 566 includes lines 1 & 19–35. Line 1 is included because it is an attribute that applies to all the records below (and inside) of the attribute. The attribute 552 is a pushed attribute on the second record.

FIG. 23 is an example of a flattened data document 580 in accordance with one embodiment of the invention. The flattened data document 580 is an example of how the XML document 550 may be flattened. The first line 582 of the flattened document 580 includes the attribute 552 and a record indicator 584. The second line 586 contains the attribute 554 (category=Residential) and the open tag "Phonebook". The third line 588 contains all the open tags before the first data element "Brandin" 590. Note that the first line 592 of the next record contains the pushed attribute (country=USA) 552. All lines contain a record indicator 584 and this is helpful in converging a search. For instance, assume we had a query for "last name=Brandin and First Name=Chris". The first target (last name=Brandin) has two hits, line 588 and line 594. The second target has one hit line 596. Since the record indicator for lines 588 and 596 are "000000002", then the search converges on the record "0000002" and that record is returned to the user. The other line 594 has record indicator "000000013". Note that the flattened document might also include the formatting information in FIG. 2.

Figure 24:
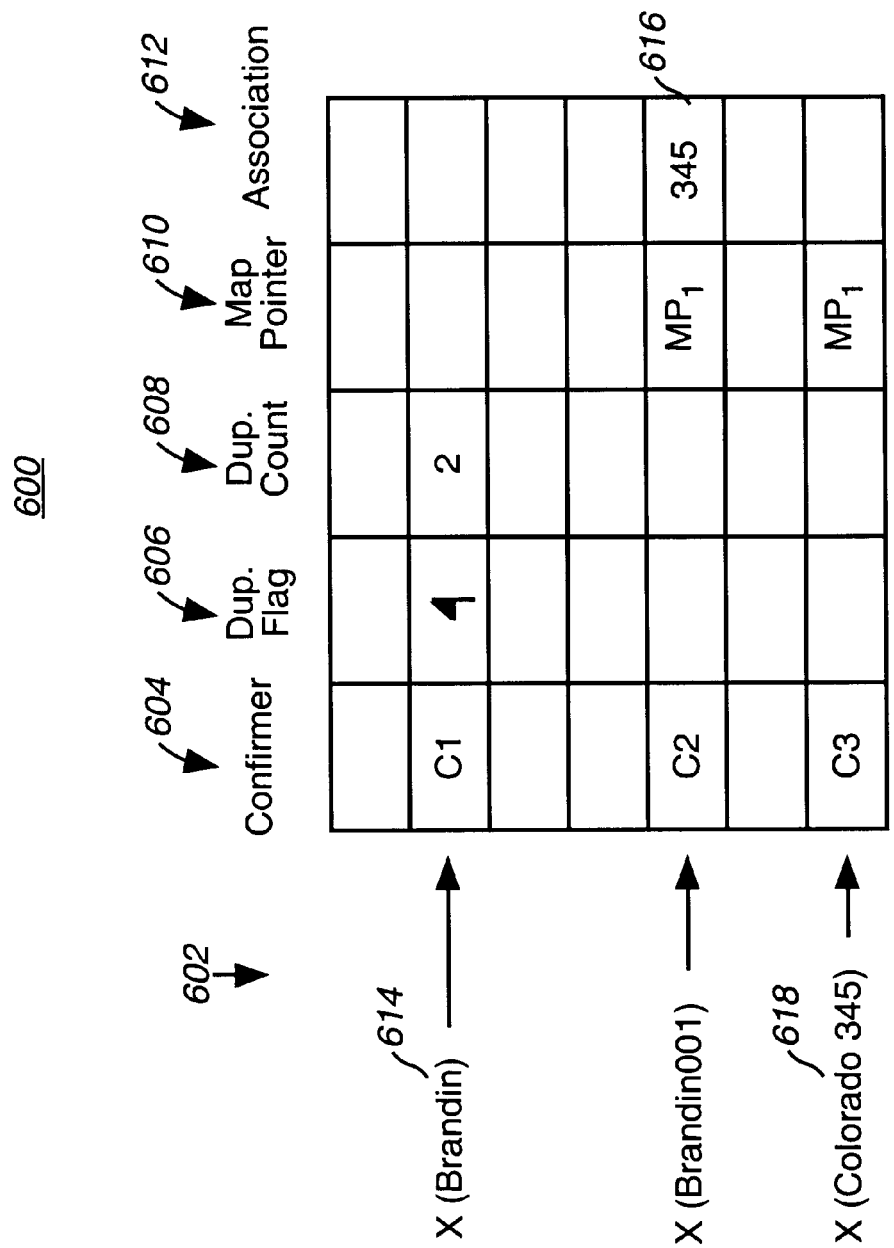
FIG. 24 is an example of a map index in accordance with one embodiment of the invention.

FIG. 24 is an example of a map index 600 in accordance with one embodiment of the invention. In one embodiment the map index is an associative memory such as the memory shown in U.S. patent application Ser. No. 09/419,217, entitled "Memory Management System and Method" filed on Oct. 15, 1999, assigned to the same assignee as the present application and hereby incorporated by reference. The map index 600 has an address 602, a confirmer 604, a duplicate flag 606, a duplicate count 608, a map pointer 610 and an association 612. The address for an item, such as a data entry, to be indexed is found by transforming the data element. The confirmer 604 is part of the transform the other part is the address. The confirmer 604 is used to differentiate collisions between distinct items. The duplicate flag 606 is used to indicate a true duplicate exists. A duplicate count 608 keeps a count of the number of duplicates. The map pointer 610 points to the location where the item can be found in the map store. The association 612 is used to find a quick intersection between targets (items) that have multiple entries. Assume a query of "last name=Brandin and state=Colorado". There would be thousands of entries for the target Colorado, but a significantly more limited number of people with the last name Brandin. By transforming "Brandin" 614 we find there are two duplicates. Next we transform "Brandin001", where "001" is the instance count. This points to an address 616 having an association 612 (345). The transform of "Colorado 345" 618 is determined. Since there is a confirmer C3, at this address and the map pointer (MP1) is the same we know it is part of the same record. If an entry has not been found then we would have looked at the second instance of Brandin and repeated the steps to see if there was a convergence.

Figure 25:
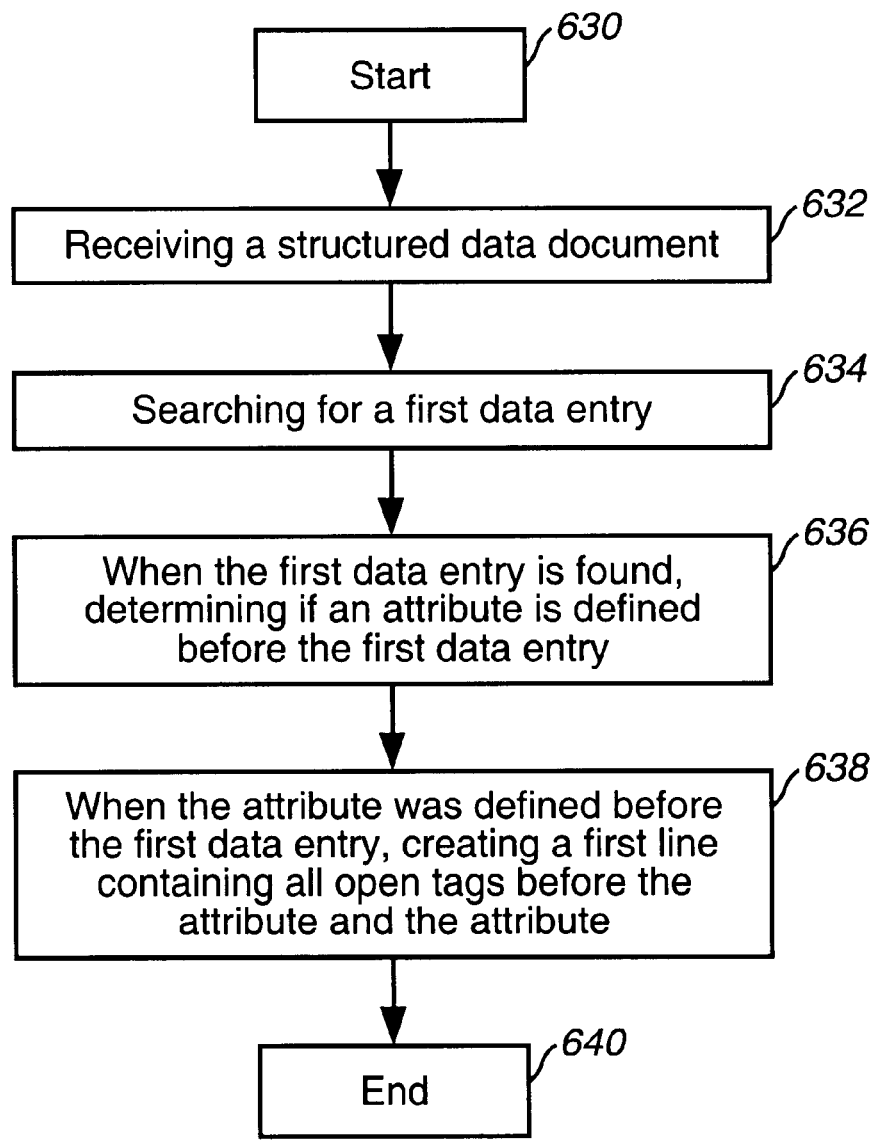
FIG. 25 is a flow chart of the steps used in a method of flattening a structured data document.

FIG. 25 is a flow chart of the steps used in a method of flattening a structured data document. The process starts, step 630, by receiving a structured data document at step 632. The first data entry is searched for by the system at step 634. When the first data entry is found, it is determined if an attribute is defined before the first data entry at step 636. When the attribute was defined before the first data entry at step 638, a first line is created containing all open tags before the attribute and the attribute which ends the process at step 640. In one embodiment it is next determined if a second attribute is defined before the first data entry. When the second attribute is not defined before the first data entry, another line is creating containing a set of open tags up to the first data entry.

In one embodiment, a record is defined for the structured data document. The record indicator and the data entry are added to the another line. A next data entry is searched for by the system next. When the next data entry is found, it is determined if the next data entry is in a different record than the first data entry. When the next data entry is in the different record, a next line containing all open tags before the attribute and the attribute is created. Then all open tags preceding the next data entry are stored in a line after the next line. The next data entry and a record indicator are also stored. This process is repeated to form a flattened document.

Figure 26:
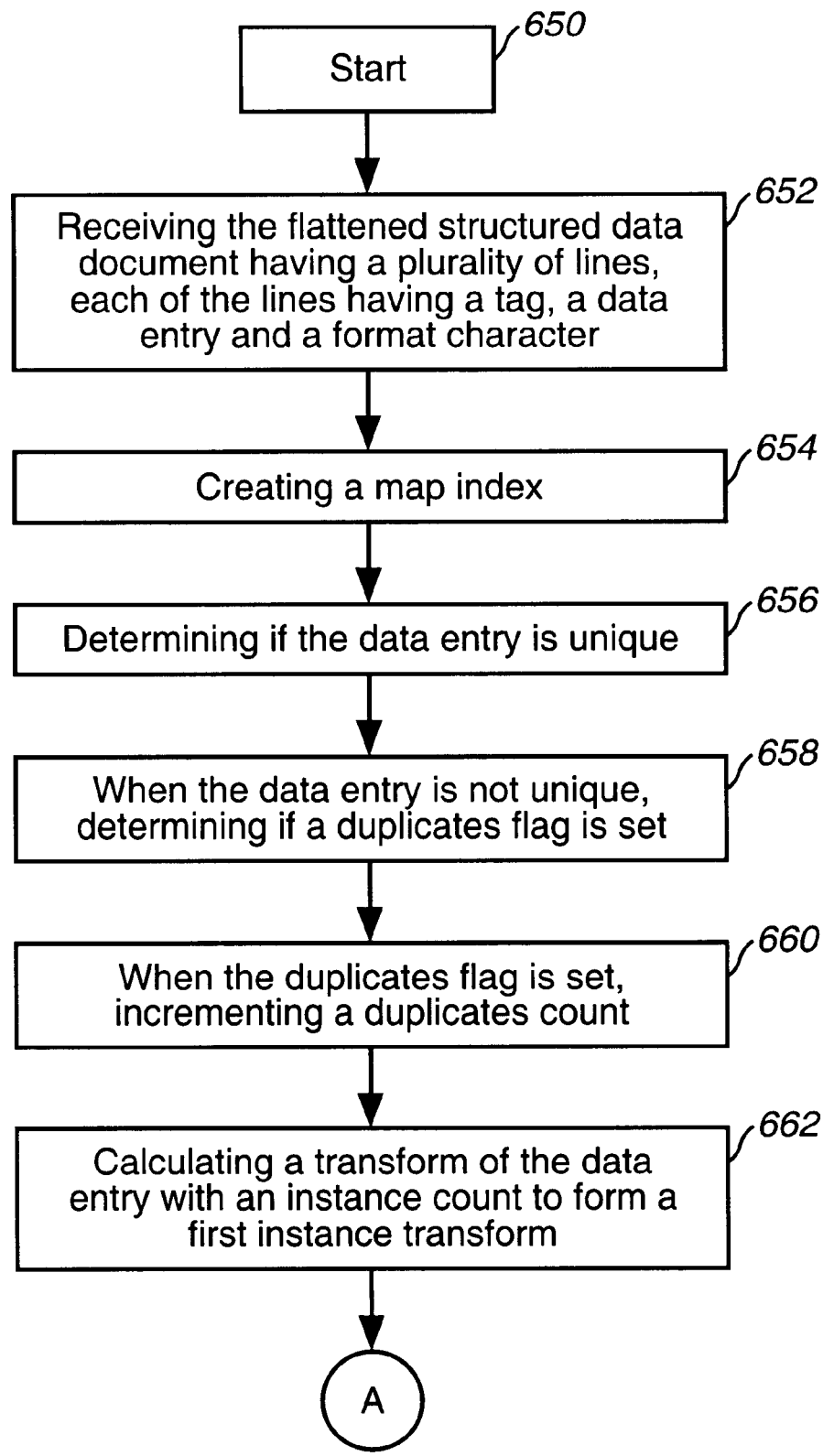
FIGS. 26 & 27 are a flow chart of the steps used in a method of storing a flattened data document.
Figure 27:
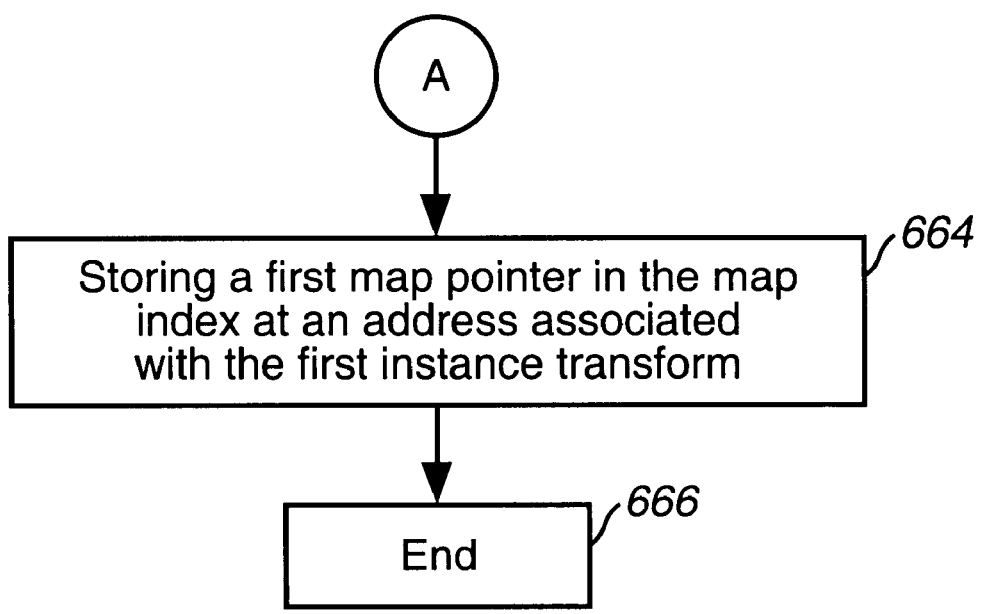

FIGS. 26 & 27 are a flow chart of the steps used in a method of storing a flattened data document. The process starts, at step 650, by receiving the flattened structured data document having a plurality of lines, each of the lines having a tag, a data entry and a format character at step 652. A map index is created at step 654. Next it is determined if the data entry is unique at step 656. When the data entry is not unique, determining if a duplicates flag is set at step 658. When the duplicates flag is set, a duplicates count is incremented at step 660. A transform of the data entry with the instance count is calculated to form a first instance transform at step 662. At step 664 a first map pointer is stored in the map index at an address associated with the first instance transform which ends the process at step 666. Note the transform can be a CRC (cyclical redundancy code) or polynomial code. In one embodiment an association is stored at the address in the map index. A transform is calculated of the second data entry with the association to form a first associated data entry. A query having two targets is received. Next it is determined if a first target has fewer entries than the second target. When the first target has fewer entries than the second target, a first instance of the first target is looked up to find a first association. The second target with the association is transformed to form a second target association. When the entry for the second target is found, it is determined that a match has been found. When the second target is not found, a second instance of the first target is looked up to find a second association. The steps are repeated with the second association.

Thus there has been described a method of flattening a structured data document and storing the resulting flattened data document. The methods decrease the amount of memory necessary to store the information in the structured data documents and significantly reduce the time to search the document.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of flattening a structured data document, comprising the steps of:
   a) receiving a structured data document;
   b) searching for a first data entry;
   c) when the first data entry is found, determining if an attribute is defined before the first data entry; and
   d) when the attribute was defined before the first data entry, creating a first line containing all open tags before the attribute and the attribute.

2. The method of claim 1, further including the steps of:
   e) determining if a second attribute is defined before the first data entry;
   f) when the second attribute is not defined before the first data entry, creating another line containing a set of open tags up to the first data entry.

3. The method of claim 1, wherein step (b) further includes the step of:
   b1) defining a record in the structured data document.

4. The method of claim 3, further including the steps of:
   g) adding the first data entry and a record indicator to the another line.

5. The method of claim 4, further including the steps of:
   h) searching for a next data entry;
   i) when the next data entry is found, determining if the next data entry is in a different record than the first data entry;
   j) when the next data entry is in the different record, creating a next line containing all open tags before the attribute and the attribute.

6. The method of claim 5, further including the steps of:
   k) storing all open tags preceding the next data entry in a line after the next line and the next data entry and a new record indicator;
   l) repeating the steps to form a flattened document.

7. The method of claim 6, further including the steps of:
   m) receiving a query having two targets;
   n) determining if a first target entries and a second target entries have a common record indicator;
   o) when one of the first target entries and the second target entries have the common record indicator, retrieving a record associated with the common record indicator.

8. A method of storing a flattened structured data document, comprising the steps of:
   a) receiving the flattened structured data document having a plurality of lines, each of the lines having a tag, a data entry and a format character;

b) creating a map index;

c) determining if the data entry is unique;

d) when the data entry is not unique, determining if a duplicates flag is set;

e) when the duplicates flag is set, incrementing a duplicates count;

f) calculating a transform of the data entry with an instance count to form a first instance transform; and g) storing a first map pointer in the map index at an address associated with the first instance transform.

9. The method of claim 8, further including the step of:

h) storing an association at the address in the map index.

10. The method of claim 9, further including the steps of:

i) calculating a transform of the second data entry with the association to form a first associated data entry.

11. The method of claim 10, further including the steps of:

j) receiving a query having two targets;

k) determining if a first target has fewer entries than a second target;

m) when the first target has fewer entries than the second target, looking up a first instance of the first target to find a first association;

n) transforming the second target with the association to form a second target association;

o) performing a lookup at an address pointed to by the second target association;

p) when the entry for the second target is found, determining a match has been found.

12. The method of claim 11, further including the steps of:

q) when the second target is not found, looking up a second instance of the first target to find a second association;

r) repeating steps n through p with the second association.

13. A system for storing a flattened structured data document, comprising:

a flattener receiving the structured data document;

a parser connected to the flattener and locating a data element;

a transform generator receiving the data element;

a map store connected to the parser and the transform generator;

a map index connected to the parser and the transform generator; and a dictionary connected to the map store.

14. The system of claim 13, wherein the flattener includes a record indicator with each line.

15. The system of claim 14, wherein each record starts with a line containing any pushed attributes.

16. The system of claim 15, wherein the map index contains an entry for the data element, the entry is located at an address associated with a transform of the data element.

17. The system of claim 16, wherein the map index contains a second entry for the data element with an instance count, the second entry is located at a second address associated with a second transform of the data element with the instance count.

18. The system of claim 17, wherein the map index contains a third entry for a second data element in a same record as the data element.

19. The system of claim 18, wherein the third entry is located at a third address associated with a third transform of the second data element with an association from the first data element.

* * * * *